United States Patent [19]
Schlitt

[11] 3,839,915
[45] Oct. 8, 1974

[54] TURN RATE SENSOR
[75] Inventor: Helmut W. E. Schlitt, Dover, Mass.
[73] Assignee: Northrop Corporation, Los Angeles, Calif.
[22] Filed: Mar. 19, 1973
[21] Appl. No.: 342,837

[52] U.S. Cl. .................................................. 73/505
[51] Int. Cl. ............................................. G01p 15/00
[58] Field of Search ....................................... 73/505

[56] References Cited
UNITED STATES PATENTS
2,753,173   7/1956   Barnaby et al...................... 73/505

Primary Examiner—James J. Gill
Attorney, Agent, or Firm—Kenway & Jenney

[57] ABSTRACT

The turn rate sensing apparatus disclosed herein employs a sensor of the vibratory tuning fork type in which a rotation about an axis parallel to the tines of the fork is sensed by means of the resultant oscillator torque generated around this same axis by the Coriolis forces acting on the vibrating tines. In order to minimize similar oscillatory torques caused by residual misalignment of the tine motions, one of the tines is selectively distorted, e.g. by heating, under servo loop control so as to dynamically minimize such misalignment. Imbalances of the tines and the amplitude of fork vibration are also controlled dynamically so as to also minimize errors.

7 Claims, 1 Drawing Figure

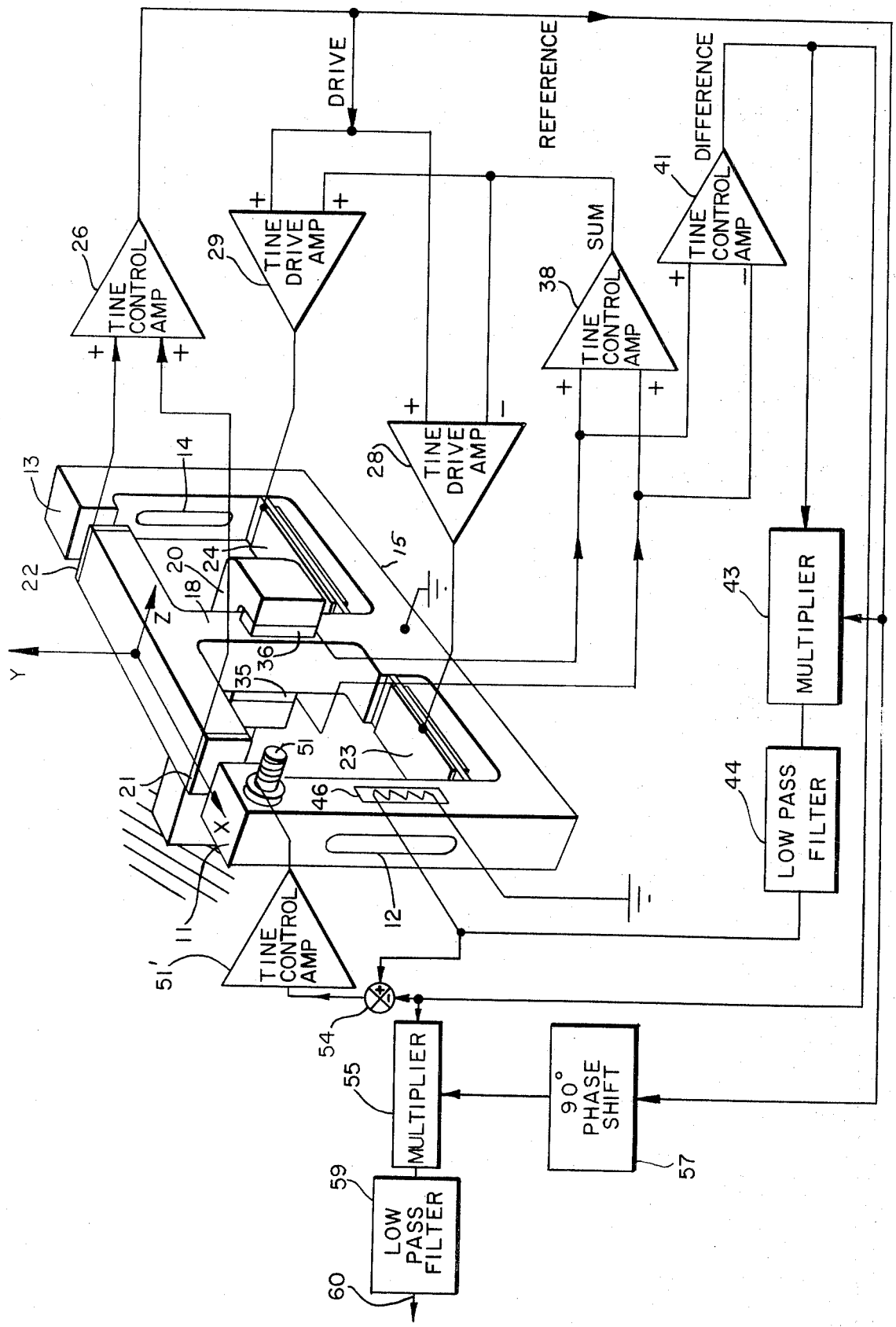

TURN RATE SENSOR

BACKGROUND OF THE INVENTION

This invention relates to turn rate sensing apparatus and more particularly to such apparatus employing a vibratory tuning fork. Most turn rate sensors in use at the present time are of the gyroscopic type employing high speed rotating wheels to provide substantial angular momentum to obtain measurable rate reaction torques. Such gyroscopes are commonly provided with fluid damping and can be constructed to provide a high degree of accuracy, though at appreciable cost. One appreciable element in the cost factor associated with such gyroscopes is the bearing wear associated with substantial masses and speeds. Further, in the case of fluid damped types, temperature control must often be applied to reduce the effects of changes in viscosity.

While various vibratory turn rate sensing systems have been proposed heretofore, none has proved sufficiently accurate and reliable to achieve significant commercial acceptance. In each case, the residual errors, e.g. those due to manufacturing tolerances, etc., have proved either too significant or too difficult and expensive to reduce to tolerable levels.

Among the several objects of the present invention may be noted the provision of a novel turn rate sensor of the vibratory type; the provision of a turn rate sensor of improved accuracy and reliability; the provision of such a turn rate sensor having a substantial operational life span; and the provision of such apparatus which is of relatively simple and inexpensive construction. Other objects and features will be in part apparent and in part pointed out hereinafter.

SUMMARY OF THE INVENTION

Briefly, rate of rotation sensing apparatus according to the present invention employs a mechanically resonant system including a pair of mass elements and spring suspension means coupling the elements for opposed oscillation generally along a first axis, the suspension including electrically energizable forcing means for varying the relative alignment of the oscillatory mass elements with respect to the first axis. The resonant system is driven into vibration, preferably at a predetermined amplitude, and means are provided for detecting angular oscillations of the system around a second axis, which second axis is perpendicular to the first axis. The energization of the forcing means is controlled by the detecting means and the level of energization applied to the forcing means is varied in response to the component of detected angular oscillation which is in-phase with the vibration of the resonant sensing system. Accordingly, a servo loop is formed tending to minimize the in-phase component. The quadrature component of the detected angular oscillation is then indicative of the rate of rotation of the mechanically resonant system around the second axis.

BRIEF DESCRIPTION OF THE DRAWINGS

The single FIGURE is a schematic block diagram of a turn rate sensing system constructed in accordance with the present invention.

DESCRIPTION OF THE PREFERRED EMBODIMENT

Referring now to the drawing, there is indicated at 10 generally a tuning fork having a pair of generally parallel tines 11 and 13 mounted on a base 15. A center post 18 extends from the base 15 between and essentially parallel to the tines 11 and 13 so as to encompass the center of mass of the overall fork. The fork is supported near the center of mass, e.g. by a suitable holder structure as indicated at 20. Interposed between the fork and the holding structure are a pair of piezoelectric strain sensors 35 and 36 which, as explained in greater detail hereinafter, detect vibrational movement of the overall fork structure. For the purpose of illustration, the fork is shown diagrammatically as a relatively open construction. In actual practice, the fork is constructed in a compact form of a high fatigue strength metal such as Elgiloy. One construction, for example, has the approximate dimensions of 1.3 × 1.0 × 1.75 inches with a weight of approximately 2.0 ounces and a resonance frequency of 2,000 cycles per second.

As may be seen, the tines 11 and 13 are adapted for opposed vibration generally along an axis, designated the X axis, extending between the ends of the two tines. The tines are considered to extend generally parallel to a transverse axis, designated the Y-axis, which passes through the center of mass of the fork. The remaining orthogonal axis is considered the Z-axis.

Whithin manufacturing tolerances, the fork 10 is constructed so as to be symmetrical about the Y-Z plane. The fork is thus a generally planar structure, its principal plane being the X-Y plane.

The tines 11 and 13 may be driven into vibration by means of piezoelectric tine drive motors 24 and 23, each of which is mounted between the respective tine and the center post 18. A feedback control loop is provided to maintain constant composite peak-to-peak amplitude vibrations of tines 11 and 13. A pair of capacitive proximity sensors 21 and 22 provide signals which are a measure of the distance between the respective tines and the center post 18. For simplicity, conventional biasing and detector circuits for the sensors 23 and 24 have been omitted from the drawing. The separation signals are summed, as indicated at 26 to provide an output signal which is a measure of the instantaneous sum of the tine displacements from center post 18. This signal is applied as a positive input signal to each of a pair of tine drive amplifiers 28 and 29 which energize the respective tine drive motors 23 and 24. In operation, this loop is effective to insure that tines 15 and 16 oscillate sinusoidally with a composite displacement having a constant peak amplitude. A suitable amplitude for the compact fork structure described previously is about 0.003 inches.

The piezoelectric strain detectors 35 and 36 detect forced developed between the fork and its mounting. As will be apparent to those skilled in the art, in-phase signals generated by the detectors 35 and 36 will be indicative of translational forces acting on the center post, i.e. in the direction of the X axis, while differential signals will be developed by torques exerted around the Y axis. The signals obtained from the detectors 35 and 36 are summed as indicated at 38 and the resultant signals is applied as a second input to each of the tine drive amplifiers 28 and 29. This common mode component of the center post signal is added to the tine displacement signal in the case of the amplifier 29 and subtracted from the tine displacement signal in the case of the amplifier 28. The differential thereby introduced between the amplitudes of the drive signals supplied to the tine drive motors 21 and 23 compensates for any imbalance between the tines 11 and 13. In other words, a second servo loop is formed which tends to null the common mode force component acting on the control structure and detected by the sensors 35 and 36, without disturbing the composite peak-to-peak amplitude being maintained by the first servo loop.

As mentioned previously, oscillatory torques around the Y axis can be produced either by rate-generated Coriolis effects or by misalignment of the motions of tines 11 and 13. While both torque components produce differential mode signals between the detectors 35 and 36, which signals are synchronous with the vibrations of the fork, the component due to misalignment will be proportional to the instantaneous tine acceleration while the Coriolis induced component will be proportional to the tine velocity. The two components are thus in phase quadrature. However, since the tine misalignment component will, even under the best conditions, be many orders of magnitude greater than the typical Coriolis-induced component, separation by synchronous quadrature detection alone is impractical because the residual cross-coupling is too large even with the best of synchronous detectors or multipliers.

In the embodiment illustrated, the differential between the signals provided by the sensors 35 and 36 is obtained as indicated at 41 to obtain a signal indicative of the torque around the Y axis. This signal is then synchronously demodulated by means of a multiplier 43, the drive signal which is in-phase with the time deflection being applied as a phase reference to the other input of the multiplier. The multiplier 43 generates a signal having a d.c. component which is proportional to the degree of misalignment of the tines 11 and 13. Separated out by a low pass filter 44, this d.c. component is applied to energize a heater 46 which is mounted on one face of the tine 11 so as to produce a differential expansion. The tine 11 is preferably slotted as indicated at 12 to facilitate this deliberate distortion. The tine 13 is preferably similarly slotted as indicated at 14 to preserve symmetry. The heater 46 provides a forcing means for controllably distorting the tine 11 so as to obtain exact alignment of the motions of the tines 11 and 13. As will be understood, it may be necessary to deliberately introduce a slight initial misalignment so as to bring the desired position within the range achievable by means of the heater. As the heater is energized by means of a function of a signal which is responsive to misalignment of the tines, it can be seen that a third servo loop has been formed, which loop operates to dynamically minimize such misalignment. Since this loop can operate at a low bandwidth and relative slow response time, e.g. in the order of 1 cycle per second, quite high levels of gain can be employed, i.e. in the order of $10^9$. Accordingly, this source of error, which is otherwise difficult to distinguish, can be reduced to a correspondingly low level. By reducing misalignment torques in this way, it is possible to substantially eliminate errors due to the residual cross-coupling between quadrature components which occurs in any practical synchronous detection system.

The Y axis torque signal is also synchronously demodulated to obtain a quadrature component by means of a second multiplier 55, the common mode drive signal being applied as a second input to this second multiplier through a 90° phase shifter 57 so as to obtain an appropriate phase reference signal. The d.c. component of this detection process, obtained by means of a low pass filter 59, is then indicative of the rate of rotation of the tuning fork sensor around the Y axis.

In order to minimize errors due to non-linearities and other sources, the turn rate sensing circuitry is also operated in a feedback mode. For this purpose, an electromagnetic forcer 51 is mounted adjacent the tine 11 for exerting a torque on the fork about the Y axis. By energizing this forcer synchronously with the tine vibration and with an amplitude which varies as a function of the amplitude of the Coriolis-induced torque, a so-called torque-to-null mode of operation can be obtained. In this mode, the fork is torqued about the Y axis to balance the oscillatory Coriolis-induced torque thereby minimizing or nulling the corresponding component of the differential mode signal developed between the detectors 35 and 36. For this purpose, the a.c. difference signal from the amplifier 41 is applied to the electromagnetic forcer 51 through an appropriate amplifier 51'. This loop may advantageously have an a.c. bandwidth in the order of 100 cycles per second. The level of signal required to obtain null is then an accurate measure of externally impressed rotations around the Y axis up to 100 cps.

Preferably, the forcer 51 is also energized with a d.c. component derived from the tine misalignment correcting loop. This d.c. component is summed with the a.c. component, as indicated at 54, prior to the drive amplifier 51. This feedback path aids in minimizing the misalignment, operating with a faster time constant than the heater 46. This d.c. feedback path through the magnetic forcer 51 also aids stability in the tine alignment loop since the high gain applied requires a relatively high natural frequency for stability. Any residual component in phase with the tine deflection is eliminated from the output signal by the synchronous detection of the quadrature component at the multiplier 55.

In view of the foregoing, it may be seen that several objects of the present invention are achieved and other advantageous results have been attained. It is important to realize that the elimination of the very large biases of a tuning fork structure which normally cannot be handled only by quadrature demodulation can only be accomplished by means of very high gain servo loops which do not require the use of precisely phase a.c. components and, therefore, do not pose any significant requirement on the selection of the phase shift of the voltages to be used in the loops.

As various changes could be made in the above constructions without departing from the scope of the invention, it should be understood that all matter contained in the above description or shown in the accompanying drawings shall be interpreted as illustrative and not in a limiting sense.

What is claimed is:

1. Rate of rotation sensing apparatus comprising:
    a mechanically resonant system including a pair of mass elements and spring suspension means coupling said elements for opposed oscillation generally along a first axis, said suspension including also electrically energizable forcing means for varying the relative alignment of said oscillatory mass elements with respect to said first axis;
    means for driving said resonant system into vibration;

means for detecting angular oscillation of said system around a second axis which is perpendicular to said first axis;

means, controlled by said detecting means and responsive to the component of detected angular oscillation which is in-phase with the vibration of the resonant system, for energizing said forcing means to form a servo loop tending to minimize said component, the quadrature component of the detected angular oscillation being indicative of the rate of rotation of said mechanically resonant system around said second axis.

2. Rate of rotation sensing apparatus comprising:
a tuning fork having a pair of generally parallel tines adapted to vibrate in opposition along an axis lying generally in the plane of said tines;
means for driving said tuning fork into vibration at a predetermined amplitude;
heater means for selectively distorting one of said tines to deflect it transversely with respect to said plane;
means for detecting angular oscillation of said fork around an axis generally paralleling said tines;
means, controlled by said detecting means and responsive to the component of detected oscillation which is in-phase with the vibration of the resonant system, for energizing said heater means to form a servo loop tending to minimize said component, the quadrature component of the detected oscillation being indicative of the rate of rotation of said tuning fork around said tine paralleling axis.

3. A turn rate sensing gyroscope system for sensing an externally impressed rate of angular displacement of said system, comprising:
a vibrating element;
a servo controlled feedback loop for providing constant amplitude oscillations of said vibrating element;
a servo controlled feedback loop for offsetting static and dynamic imbalances about a first plane of symmetry and translation of said vibrating element;
a servo controlled feedback loop for offsetting static and dynamic imbalances about a second plane of symmetry of said vibrating element;
a servo controlled feedback loop for offsetting inertial forces externally impressed on said vibrating element.

4. Rate of rotation sensing apparatus comprising:
a tuning fork having a pair of generally parallel tines adapted to vibrate in opposition along an axis lying generally in the plane of said tines and a central post also in said plane;
means for driving each of said tuning fork tines into vibration;
means responsive to the composite amplitude of said vibration for controlling the energization of said driving means to obtain vibration of predetermined amplitude;
means responsive to translational vibration of said post for differentially controlling the energization of said driving means so as to minimize said translational vibration;
heater means for selectively distorting one of said tines to deflect it transversely with respect to said plane;
means responsive to angular oscillation of said fork around said post;
means responsive to the component of angular oscillation of said fork around said post which is in-phase with the vibration of the resonant system for energizing said heater means to form a servo loop tending to minimize said component, the quadrature component of the detected oscillation being indicative of the rate of rotation of said tuning fork around said tine paralleling axis.

5. A vibratory tuning fork turn rate gyroscope system for producing an electrical signal proportional to an externally impressed rate of angular displacement of said system, comprising:
a planar vibratory tuning fork having in the principal plane a center post and two tines extending from the base of said fork, said center post having a rectangular cross-section and extending from said base uniformly about the axis of symmetry of said tuning fork, said tines being positioned symmetrically on opposite sides of said center post, the first of said tines being slotted, having a slot in a plane parallel to the said principal plane and extending along a substantial length of said first tine from the inner to the outer boundary of said first tine, and the second of said tines being homogeneous;
a tine vibration amplitude servo controlled feedback loop comprising:
 a. a capacitive proximity sensing means associated with each of said tines, each of said sensing means having a proximity reference sensor, respectively positioned on said center post and the associated one of said tines,
 b. a first tine control amplifier means having inputs connected to the respective ones of said proximity transmitting sensors for producing an output signal representative of the sum of the displacements of the ones of said tines with respect to said center post,
 c. a tine drive amplifier means associated with each of said tines, each of said drive amplifier means having a sum input connected to said first tine control amplifier means;
a tine imbalance servo controlled feedback loop comprising:
 a. a piezoelectric strain detection means having two sensor means attached to said center post,
 b. a second tine control amplifier means having sum inputs connected to the respective ones of said sensor means for producing a common mode output signal representative of the sum of the strains detected by said torque sensor means,
 c. a tine drive amplifier means associated with each of said tines, a first of said drive amplifier means associated with said slotted tine having a difference input connected to said second tine control amplifier means, and a second of said drive amplifier means associated with said second tine having a sum input connected to said second tine control amplifier means,
 d. a piezoelectric tine drive motor means associated with each of said tines, each of said motor means having an input connected to the respective one of said tine drive amplifier means, each of said motor means positioned on the base of said tuning fork adjacent to the respective ones of said first and second tines;
a tine planar oscillation servo controlled feedback loop comprising:

a. said piezoelectric crystal torque sensing means, b. a third tine control amplifier means having a sum input connected to a first and a difference input connected to the second of said torque transmitting sensor means, for producing a differential mode output signal representative of the difference between the torque detected by said torque sensing means, c. multiplier means having a first input connected to said first tine control amplifier means and the second input connected to said third tine control amplifier means, d. a low pass filter mean having an input connected to said multiplier means, e. a heat generator means having an input connected to said low pass filter multiplier means, and positioned on an outside surface of said slotted tine overlapping said slot; and a turn rate sensing servo controlled feedback loop comprising:

a. said piezoelectric crystal torque detection means, b. said third tine control amplifier means, c. an electromagnetic tine deflection means having an input connected to said third tine control amplifier means.

6. A method for producing in a planar vibratory tuning fork turn rate gyroscope system, an electrical signal proportional to an externally impressed rate of angular displacement of said system, including the steps of:

maintaining constant amplitude tine oscillations by a first servo controlled feedback loop;

compensating for tuning fork imbalances about a first plane of symmetry perpendicular to the principal plane of said tuning fork by a second servo controlled feedback loop;

compensating for tuning fork imbalances about a second plane of symmetry parallel to said principal plane of said tuning fork by a third servo controlled feedback loop;

maintaining planar tuning fork tine oscillations in said second plane of symmetry of said tuning fork by a fourth servo controlled feedback loop; and generating an electrical signal from signals provided by said first and fourth loops said electrical signal being proportional to said externally impressed rate of angular displacement of said gyroscope system.

7. A method for producing in a planar vibratory tuning fork rate gyroscope system, an electrical signal proportional to an externally impressed rate of angular displacement of said system, wherein said system comprises a planar vibratory tuning fork having two tines in the principal plane, tine vibration amplitude sensing means, piezoelectric torque sensing means, a piezoelectric tine drive motor means, amplifier means, analog multiplier means, tine deformation means, tine deflection means, and phase shift means, including the steps of:

maintaining constant amplitude tine oscillations by a first servo controlled feedback loop means, said first loop means comprising said amplitude sensing means, said amplifier means and said motor means;

compensating for tuning fork imbalances about the plane of symmetry perpendicular to said principal plane of said tuning fork by a second servo controlled feedback loop means, said second loop comprising said torque sensing means, said amplifier means and said motor means;

compensating for tuning fork imbalances about the plane of symmetry parallel to said principal plane of said tuning fork by a third servo controlled feedback loop means, said third loop comprising said torque sensing means, said amplifier means, said analog multiplier means and said tine deformation means;

maintaining planar tuning fork tine oscillation in said plane of symmetry parallel to said principal plane of said tuning fork by a fourth servo controlled feedback loop means, said fourth loop comprising said torque sensing means, said amplifier means and said tine deflection means; and generating an electrical signal from said signals first and fourth loops by said phase shift means and said analog multiplier means, said electrical signal being proportional to said externally impressed rate of angular displacement of said gyroscope system.

* * * * *